(12) United States Patent
Nishikawa

(10) Patent No.: US 10,605,295 B2
(45) Date of Patent: Mar. 31, 2020

(54) SENSOR FIXATION DEVICE

(71) Applicant: TLV CO., LTD., Kakogawa-shi, Hyogo (JP)

(72) Inventor: Yoshiaki Nishikawa, Kakogawa (JP)

(73) Assignee: TLV Co., Ltd., Hyogo (JP)

( * ) Notice: Subject to any disclaimer, the term of this patent is extended or adjusted under 35 U.S.C. 154(b) by 7 days.

(21) Appl. No.: 15/111,870

(22) PCT Filed: Jan. 7, 2015

(86) PCT No.: PCT/JP2015/050301
§ 371 (c)(1),
(2) Date: Sep. 15, 2016

(87) PCT Pub. No.: WO2015/107962
PCT Pub. Date: Jul. 23, 2015

(65) Prior Publication Data
US 2016/0377458 A1 Dec. 29, 2016

(30) Foreign Application Priority Data
Jan. 15, 2014 (JP) .................... 2014-005506

(51) Int. Cl.
*G01D 11/30* (2006.01)
*F16B 41/00* (2006.01)
(Continued)

(52) U.S. Cl.
CPC .............. *F16B 41/002* (2013.01); *F16B 2/10* (2013.01); *F16M 13/02* (2013.01); *F16T 1/48* (2013.01); *G01D 11/16* (2013.01); *G01D 11/30* (2013.01)

(58) Field of Classification Search
CPC ...... F16L 3/1075; G01M 3/2807; G01F 15/18; F16B 37/04; F16B 13/0808; F16B 41/002; E21B 47/01; Y10T 403/535
(Continued)

(56) References Cited

U.S. PATENT DOCUMENTS 581,991 A * 5/1897 Homan ................. B52B 5/102
24/514
585,406 A * 6/1897 Rhind .................... F16M 11/12
24/514
(Continued)

FOREIGN PATENT DOCUMENTS

AU 2014294327 A1 3/2016
CN 101080853 A 11/2007
(Continued)

OTHER PUBLICATIONS

International Search Report issued in PCT/JP2015/050301, dated Feb. 10, 2015.

*Primary Examiner* — Kimberly T Wood
(74) *Attorney, Agent, or Firm* — The Webb Law Firm

(57) ABSTRACT

[Task]
To provide a sensor fixation device capable of preventing loss of mount nuts.
[Solution]
A mount body 130 of a sensor fixation device 100 in a mount state includes a first side wall 133a and a second side wall 133b which face with each other at the other end, which are perpendicular to a trap opening axis JT. The first side wall 133a includes a first mount nut retaining opening 133a1, and the second side wall 133b includes a second mount nut retaining opening 133b1. A mount nut 170 includes a nut spherical part 173 interposed between the first side wall 133a and the second side wall 133b, which has a diameter longer than the distance between the first side wall 133a and (Continued)

the second wall 133b, and is configured to be engaged with a first side wall opening 133a1 and a second side wall opening 133b1. The mount nut 170 is retained integrally with the mount body 130, ensuring to prevent loss of only the mount nut 170 during the mount work.

4 Claims, 8 Drawing Sheets

(51) Int. Cl.
    *F16B 2/10*      (2006.01)
    *G01D 11/16*     (2006.01)
    *F16T 1/48*      (2006.01)
    *F16M 13/02*     (2006.01)

(58) Field of Classification Search
    USPC ... 248/288.2, 229.11, 230.2, 231.31, 229.13, 248/229.23, 228.4, 230.4, 231.51, 316.5
    See application file for complete search history.

(56) References Cited

U.S. PATENT DOCUMENTS

| | | | | |
|---|---|---|---|---|
| 600,535 | A * | 3/1898 | Homan | A41F 11/02 24/517 |
| 623,606 | A * | 4/1899 | Homan | A24F 19/0092 248/230.4 |
| 625,032 | A * | 5/1899 | Homan | F21V 21/088 248/230.4 |
| 815,581 | A * | 3/1906 | Deaan | F16L 27/0849 285/18 |
| 1,326,933 | A * | 1/1920 | Holen | B25B 1/103 269/221 |
| 2,820,499 | A * | 1/1958 | Schaaf | F16B 5/025 411/103 |
| 4,232,497 | A * | 11/1980 | Meschnig | E04B 9/18 403/14 |
| 4,445,657 | A * | 5/1984 | Breckenridge | A01M 7/0053 24/489 |
| 4,971,497 | A * | 11/1990 | Stoffer | F16B 37/04 411/108 |
| 5,037,052 | A | 8/1991 | Crisp et al. | |
| 5,697,650 | A | 12/1997 | Brown | |
| 6,041,823 | A * | 3/2000 | Kusama | F16B 2/10 138/99 |
| 6,374,665 | B1 * | 4/2002 | Somppi | B62D 17/00 73/146 |
| 6,793,655 | B2 * | 9/2004 | Orsak | A61B 17/6425 606/57 |
| 8,814,462 | B2 * | 8/2014 | Care | F01D 21/045 403/337 |
| 9,851,260 | B2 * | 12/2017 | Yumoto | F16B 2/10 |
| 2004/0013495 | A1 * | 1/2004 | Hassed | F16B 5/0216 411/537 |
| 2004/0167530 | A1 * | 8/2004 | Hamel | A61B 17/66 606/86 R |
| 2008/0003893 | A1 | 1/2008 | Frenken | |
| 2008/0164396 | A1 * | 7/2008 | Chen | B24B 37/30 248/316.5 |
| 2015/0286115 | A1 * | 10/2015 | Koch | B62J 11/00 248/615 |
| 2016/0161341 | A1 | 6/2016 | Yumoto | |

FOREIGN PATENT DOCUMENTS

| | | | | |
|---|---|---|---|---|
| CN | 101403640 A | | 4/2009 | |
| EP | 2538035 A2 | | 12/2012 | |
| GB | 704371 | | 2/1954 | |
| JP | 02-102004 U | | 8/1990 | |
| JP | 2001-004081 A | | 1/2001 | |
| JP | 3185701 U | | 8/2013 | |
| JP | 2013170686 A | | 9/2013 | |
| JP | 2014032742 A | * | 2/2014 | ............ F16B 37/005 |
| JP | 5559926 B1 | * | 7/2014 | ............. F16B 35/04 |
| WO | 2015012074 A1 | | 1/2015 | |

* cited by examiner

SENSOR FIXATION DEVICE

TECHNICAL FIELD

The present invention relates to a sensor fixation device, and more particularly, to the one mounted on process system constituting equipment.

BACKGROUND ART

An operation detection device 2 as shown in FIG. 8 will be described as a generally employed sensor fixation device. The operation detection device 2 includes an operation state detection sensor 3 that abuts on a steam trap inlet 1 as a detection object, a retaining member 4 connected to the operation state detection sensor 3, having a pair of insertion holes, which is positioned on one surface of the steam trap inlet 1, a grip member 5 which is positioned at the opposite surface of the steam trap inlet 1, formed substantially in a channel shape in cross section having an upper wall and both side walls, and having a pair of insertion holes in the upper wall, a plane part which is formed between the pair of the insertion holes, contacts with the plane part of a square pillar of the detecting portion and grooves of substantially V-shape in cross section that are formed on both side walls, and contacts with both sides of the curved surface of a round pillar of the detecting portion, a U bolt 6 having both legs 6a inserted into the pair of insertion holes of the grip member 5 and the retaining member 4, and a pair of nuts screwed to both legs 6a of the U bolt 6 (see Patent Literature 1).

CITATION LIST

Patent Literature

PTL 1: JP-A-2013-170686

SUMMARY Of INVENTION

Technical Problem

The operation detection device 2 has a certain point to be improved as follows. The operation detection device 2 is constituted by the retaining member 4, the grip member 5, the U bolt 6, and the pair of nuts 7, which are independent from one another. In the case where the respective members are assembled for mounting, there may cause the problem of dropping the nuts 7 from the hand to be lost. Especially in the case of the process system constituting equipment, the mount space is likely to be limited. Furthermore, the temperature of the process system constituting equipment tends to be made high, which may cause loss of the nut 7.

It is an object of the present invention to provide a sensor fixation device capable of preventing loss of the mount nut.

Advantageous Effects of Invention

Means for solving the aforementioned problem of the present invention, and advantageous effects derived therefrom will be described hereinafter.

The sensor fixation device according to the present invention is mounted on a mount portion of a process system constituting equipment, which is formed along a predetermined mount axis, and includes a body part disposed along an outer edge of the mount portion, having a first opening at one end and a second opening at the other end, a mount bolt which is inserted into the first opening and the second opening of the body part along a direction intersecting the mount axis in a mount state where the body part is disposed along the outer edge of the mount portion, and a mount nut for securing the mount bolt to the body part. The mount nut is rotatably retained with the body part so as to be screwed to the mount bolt.

The mount nut may be retained integrally with the body part. Accordingly, this makes it possible to prevent loss of only the mount nut resulting from dropping during the mount work.

In the sensor fixation device according to the present invention, the mount nut is rotatable in a direction intersecting an insertion direction of the mount bolt.

The mount nut may be disposed perpendicularly to the mount bolt irrespective of the angle at which the body part is disposed. This makes it possible to easily screw the mount bolt to the mount nut.

In the sensor fixation device, the body part includes a first side wall and a second side wall which face with each other at the other end in the mount state, while being perpendicular to the mount axis. The first side wall includes a predetermined first side wall opening. The second side wall includes a predetermined second side wall opening. The mount nut has a spherical shape disposed between the first side wall and the second side wall, which has a diameter longer than a distance between the first and the second side walls, and is configured to be engaged with the first and the second side wall openings.

The mount nut may be retained integrally with the body part. This makes it possible to prevent loss of only the mount nut by dropping during the mount work. Irrespective of the angle at which the body part is disposed, the mount nut may be perpendicularly disposed to the mount bolt. This makes it possible to easily screw the mount bolt to the mount nut.

DESCRIPTION OF EMBODIMENT

Figure 1:
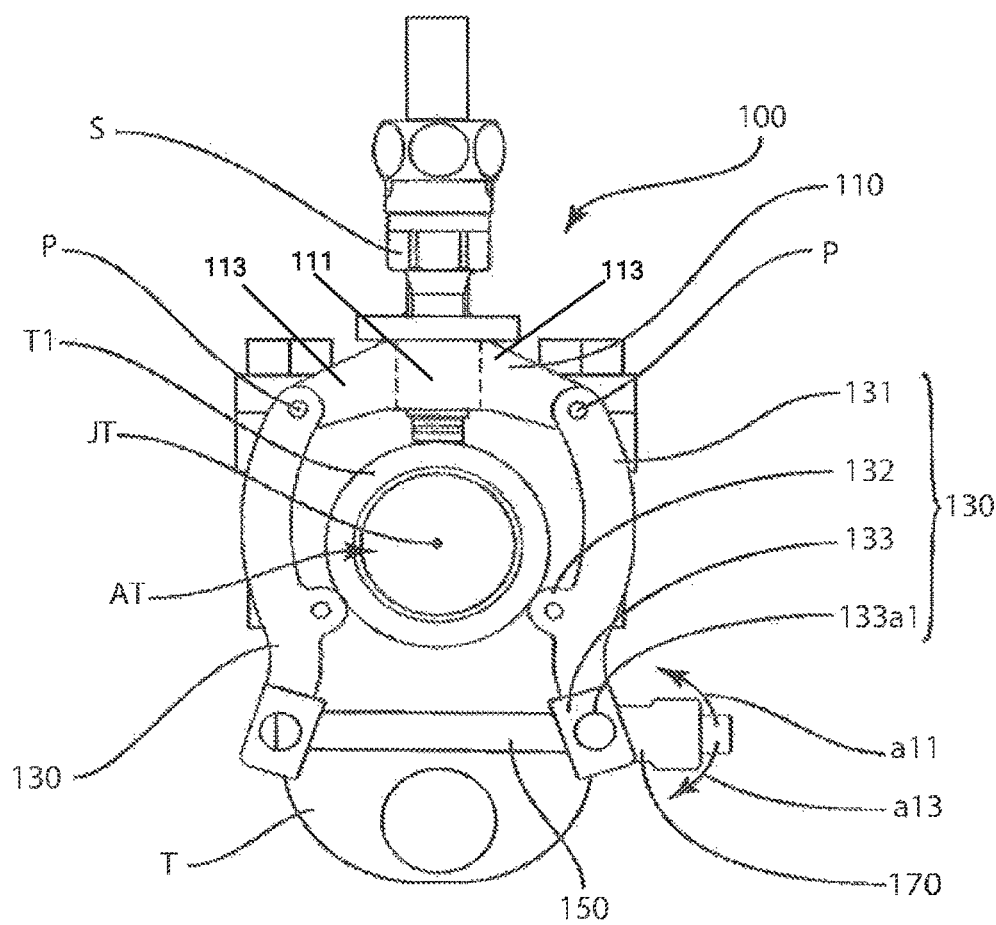
FIG. 1 is a front view of a sensor fixation device 100 as an embodiment of the sensor fixation device according to the present invention in a mount state.

Embodiments of the present invention will be described in detail referring to the drawings.

First Embodiment

Figure 2:
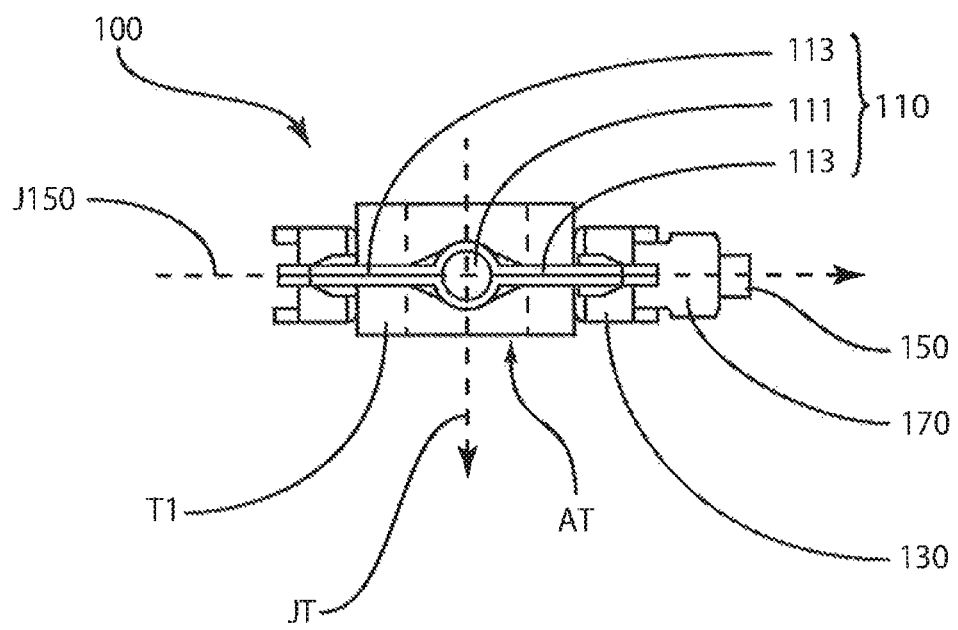
FIG. 2 is a view of the sensor fixation device 100 in the mount state as shown in FIG. 1 when seen from the upper surface side of a steam trap T.
Figure 3:
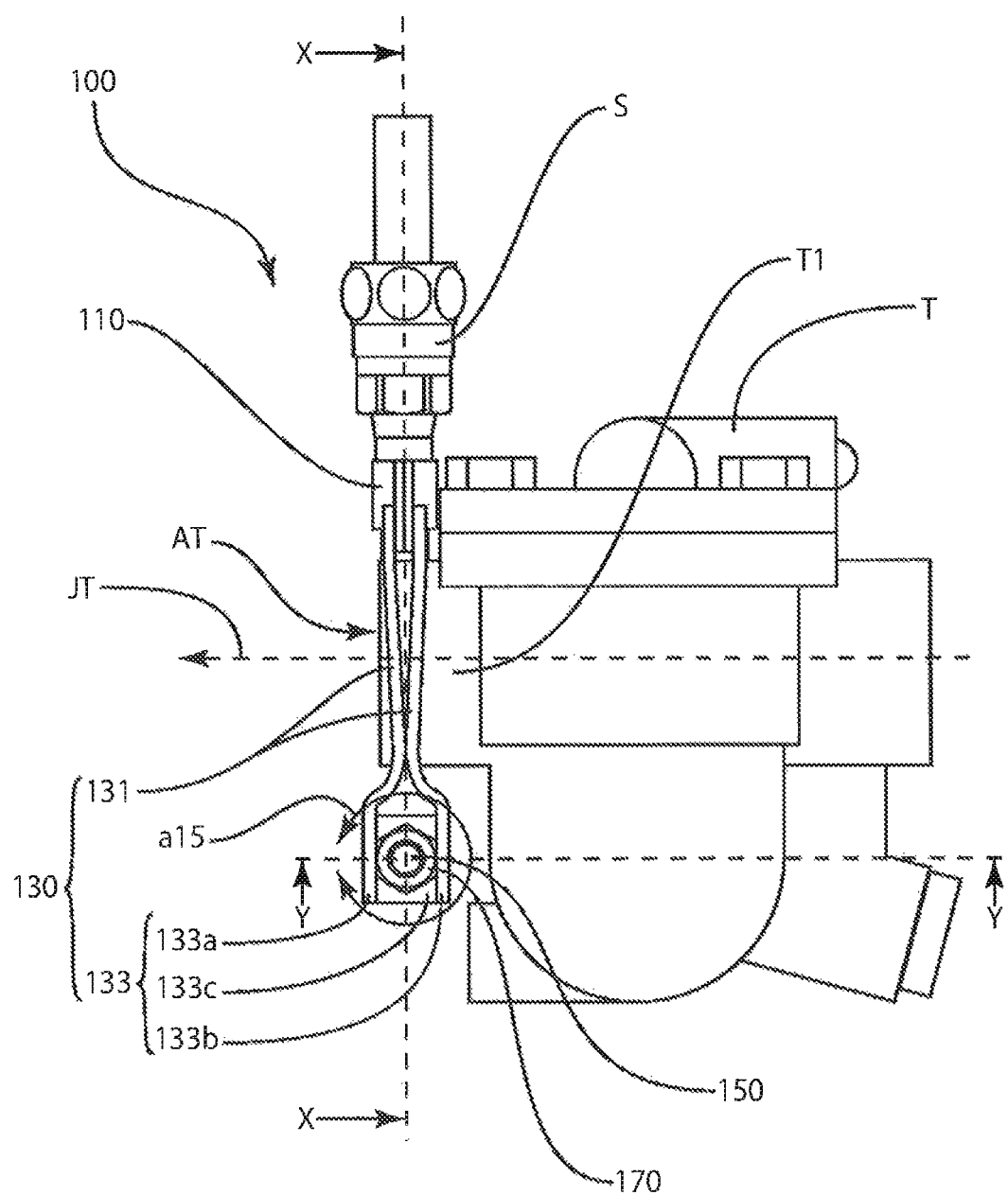
FIG. 3 is a view of the sensor fixation device 100 in the mount state as shown in FIG. 1 when seen from the right side of the steam trap T.

Referring to FIGS. 1 to 3, a sensor fixation device 100 for mounting the sensor exclusive for the steam trap will be described as an example of the sensor fixation device according to the present invention. FIG. 1 represents the sensor fixation device 100 mounted on a trap opening T1 of a steam trap T when seen from the front of the trap opening T1. FIG. 2 represents the sensor fixation device 100 in the mount state when seen from the upper surface side of the steam trap T. FIG. 2 only shows the trap opening T1 of the steam trap T, and description of the main body of the steam trap T will be omitted. FIG. 2 indicates the state of the device where a steam trap sensor S is removed. FIG. 3 represents the sensor fixation device 100 in the mount state when seen from the right side of FIG. 1.

Referring to FIG. 1, the sensor fixation device 100 in the mount state is disposed along an outer edge of the trap opening T1. The sensor fixation device 100 includes a sensor fixation body 110, a mount body 130, a mount bolt 150, and a mount nut 170.

The sensor fixation body 110 is a member for fixing the vertical steam trap sensor S. The steam trap sensor S is configured to obtain an operation state of the steam trap.

As FIG. 2 shows, the sensor fixation body 110 includes a cylindrical sensor mount opening 111 at the center. The circumference of the sensor mount opening 111 is threaded.

The sensor fixation body 110 includes a connecting arm 113 extending to the left and right from the sensor mount opening 111. The connecting arm 113 has an opening (not shown) for connecting the mount body 130 (see FIG. 1) with a pin P. The connecting arm 113 is constituted by a plate-like member.

Referring to FIG. 1 again, the mount body 130 is configured to mount the sensor fixation device 100 on the trap opening T1 by means of the mount bolt 150. The mount body 130 includes an arm 131, a trap abutment protrusion 132, and a nut mount portion 133. The arm 131 has a circular arc outer shape. The nut mount portion 133 is positionally continued from one end of the arm 131 at the side opposite the one connected to the sensor fixation body 110.

The trap abutment protrusion 132 abuts on the trap opening T1 of the steam trap T in the mount state of the sensor fixation device 100. The sensor fixation device 100 is mounted on the trap opening T1 with three points including one end of the steam trap sensor S retained with the sensor fixation body 110, and each of the left and right trap abutment protrusions 132 of the mount body 130.

As FIG. 3 shows, the nut mount portion 133 includes a first side wall 133*a*, a second side wall 133*b*, and a third side wall 133*c*. The first side wall 133*a* and the second side wall 133*b* are positioned to face with each other. The first side wall 133*a* and the second side wall 133*b* are perpendicularly positioned to a trap opening axis JT of a trap opening AT in the mount state of the sensor fixation device 100. The third side wall 133*c* is formed between the first side wall 133*a* and the second side wall 133*b* along the trap opening axis JT, that is, intersecting a bolt axis J150 (see FIG. 2) along the insertion direction of the mount bolt 150.

Figure 4:
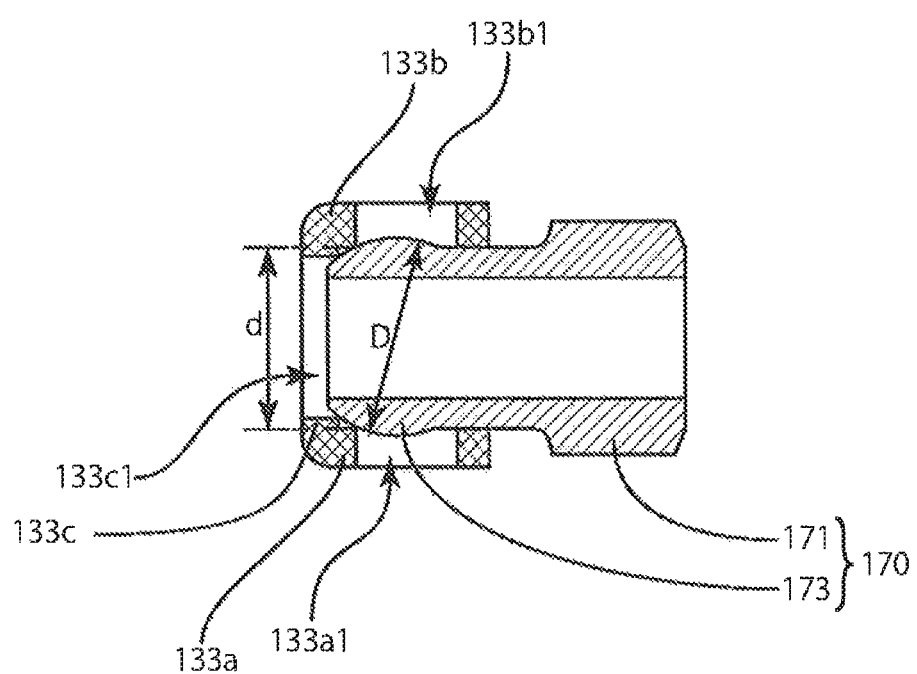
FIG. 4 is a sectional view of a mount nut and a nut mount portion taken along line Y-Y of FIG. 3.

FIG. 4 is a sectional view of the mount nut 170 and the nut mount portion 133 taken along Y-Y of FIG. 3. Referring to FIG. 4, the first side wall 133*a* includes a first mount nut retaining opening 133*a*1 as a first side wall opening. The second side wall 133*b* includes a second mount nut retaining opening 133*b*1 as a second side wall opening. The third side wall 133*c* includes a mount bolt insertion opening 133*c*1. The first mount nut retaining opening 133*al*, the second mount nut retaining opening 133*b*1, and the mount bolt insertion opening 133*c*1 will be described later.

Figure 5:
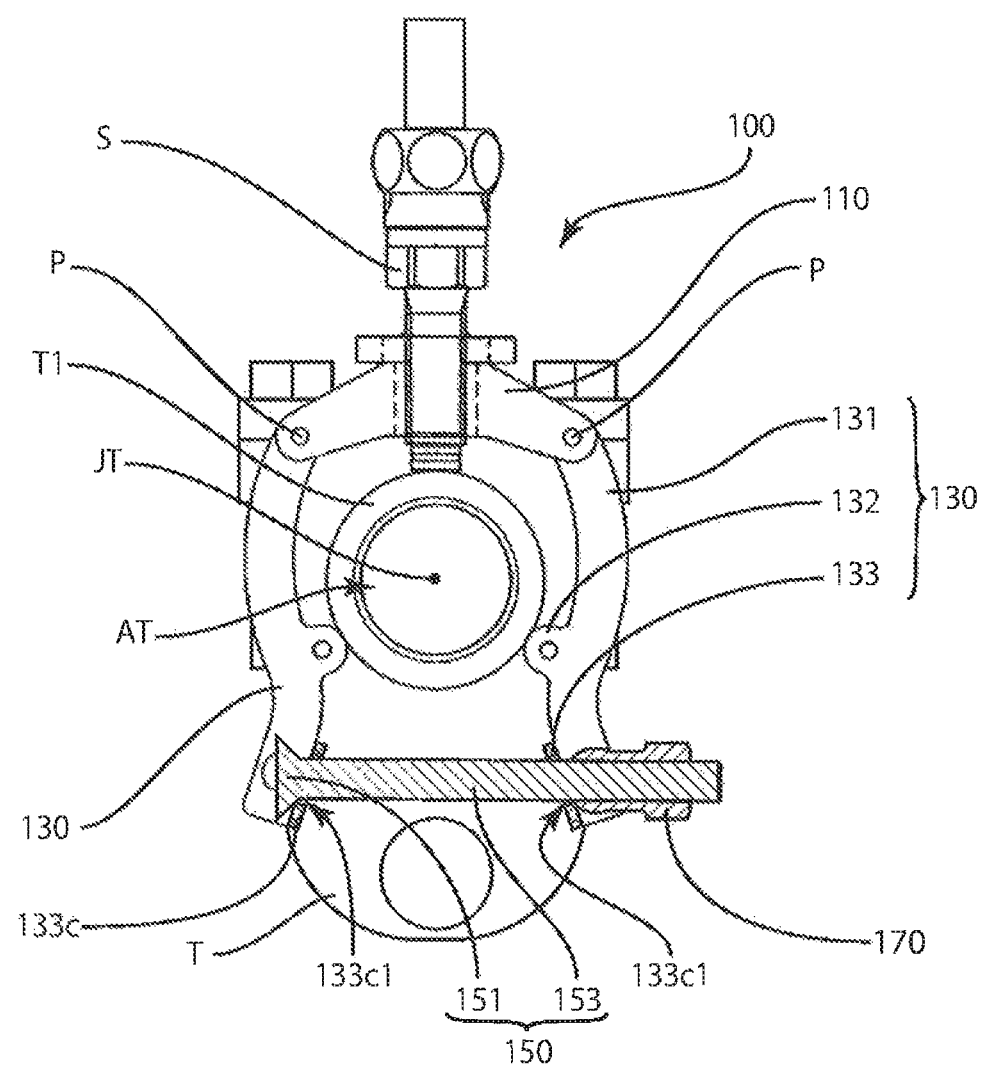
FIG. 5 is a sectional view taken along line X-X of FIG. 3.

FIG. 5 is a sectional view taken along line X-X of FIG. 3. As FIG. 5 shows, the mount bolt 150 is a screw member including a head part 151 and a shaft part 153. The mount bolt 150 has the head part 151 which abuts on the third side wall 133*c* of the mount body 130 in the mount state of the sensor fixation device 100. The mount bolt 150 is inserted into the oppositely located mount bolt insertion opening 133*c*1 to mount the sensor fixation device 100 on the steam trap T integrally with the mount nut 170.

Referring to FIG. 4, the mount nut 170 includes a nut part 171 and a nut spherical part 173. The nut part 171 has a hexagonal outer shape while having the threaded inner part adaptable to be engaged with the mount bolt 150.

The nut spherical part 173 is formed continuously from one end of the nut part 171. The nut spherical part 173 may be configured to have a part of a true sphere, for example, which allows smoother revolving or rotating motion. The nut spherical part 173 has a spherical outer shape with a diameter D longer than the length d between the first side wall 133*a* and the second side wall 133*b* of the nut mount portion 133 of the mount body 130. The nut spherical part 173 is interposed between the first side wall 133*a* and the second side wall 133*b*, and partially engaged with the first mount nut retaining opening 133*a*1 and the second mount nut retaining opening 133*b*1.

As a result, the mount nut 170 may be retained integrally with the mount body 130. Therefore, the use of the sensor fixation device 100 allows prevention of loss of only the mount nut 170 resulting from dropping during the mount work.

The mount nut 170 is rotatably retained in directions indicated by arrows a11 and a13 which intersect the trap opening axis JT as shown in FIG. 1. The mount nut 170 is also rotatably retained in the direction indicated by arrow a15 with respect to the bolt axis J150 (see FIG. 2) of the mount bolt 150.

Accordingly, the use of the sensor fixation device 100 allows the mount nut 170 to be disposed perpendicularly to the mount bolt 150 irrespective of the angle at which the mount body 130 is disposed. This makes it possible to easily screw the mount bolt 150 to the mount nut 170.

Other Embodiments (1) Mounting of sensor fixation device 100 on trap opening T1:

In the first embodiment as described above, the sensor fixation device 100 is disposed at the outer circumferential edge of the trap opening T1 using the sensor fixation body 110 and the mount body 130 so as to be mounted on the trap opening T1 of the steam trap T. However, arbitrary means may be employed without limitation so long as the sensor fixation device 100 is disposed along the outer edge of the trap opening T1.

Figure 6:
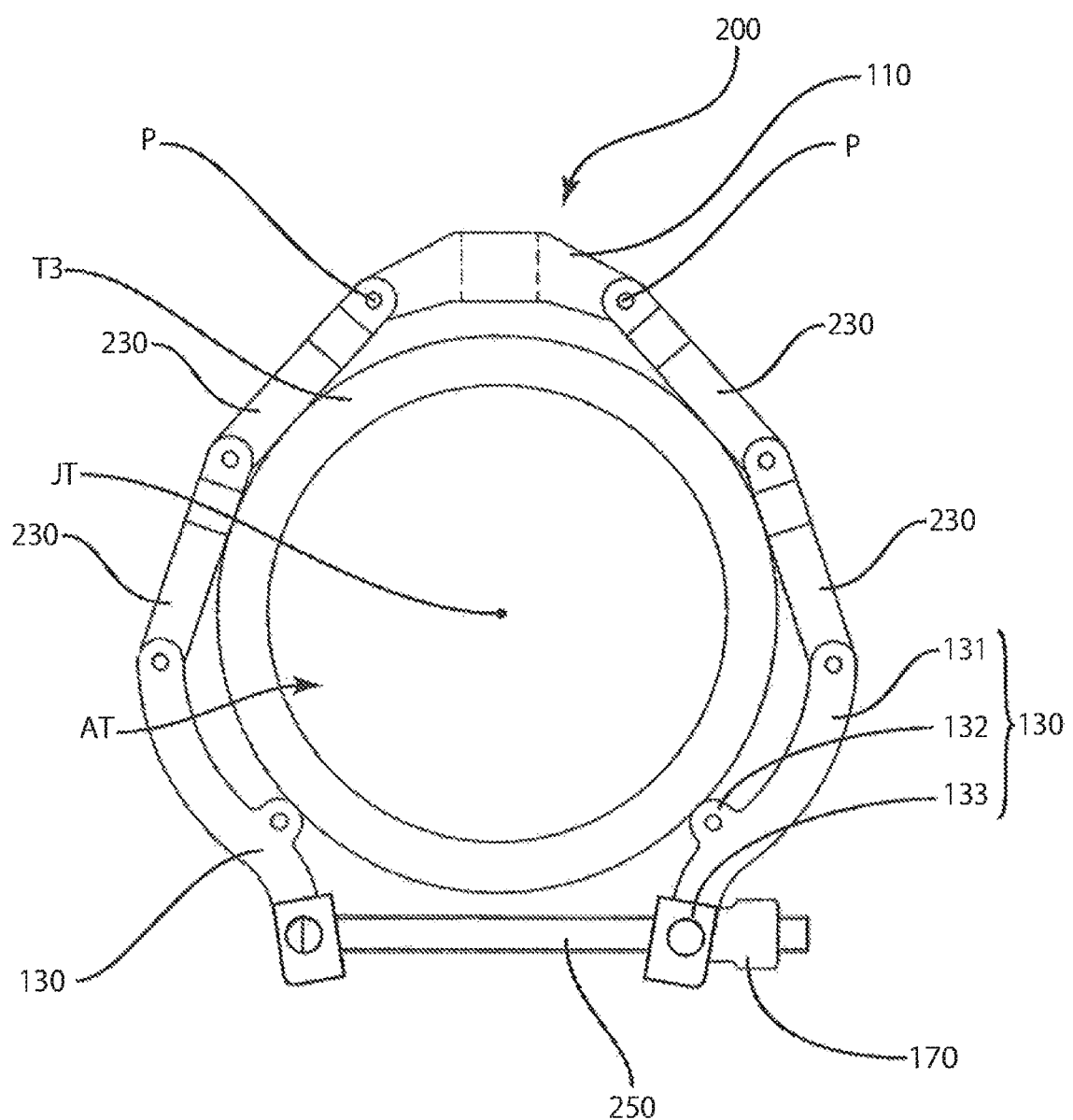
FIG. 6 is a view illustrating another embodiment of the sensor fixation device according to the present invention.

Referring to a sensor fixation device 200 as shown in FIG. 6, for example, at least one assisting mount body 230 may be disposed between the sensor fixation body 110 and the mount body 130 for mounting on the trap opening T3 with larger diameter. Amount bolt 250 suitable for the distance between the nut mount portions 133 facing with each other may be used. FIG. 6 omits the steam trap sensor S.

Figure 7:
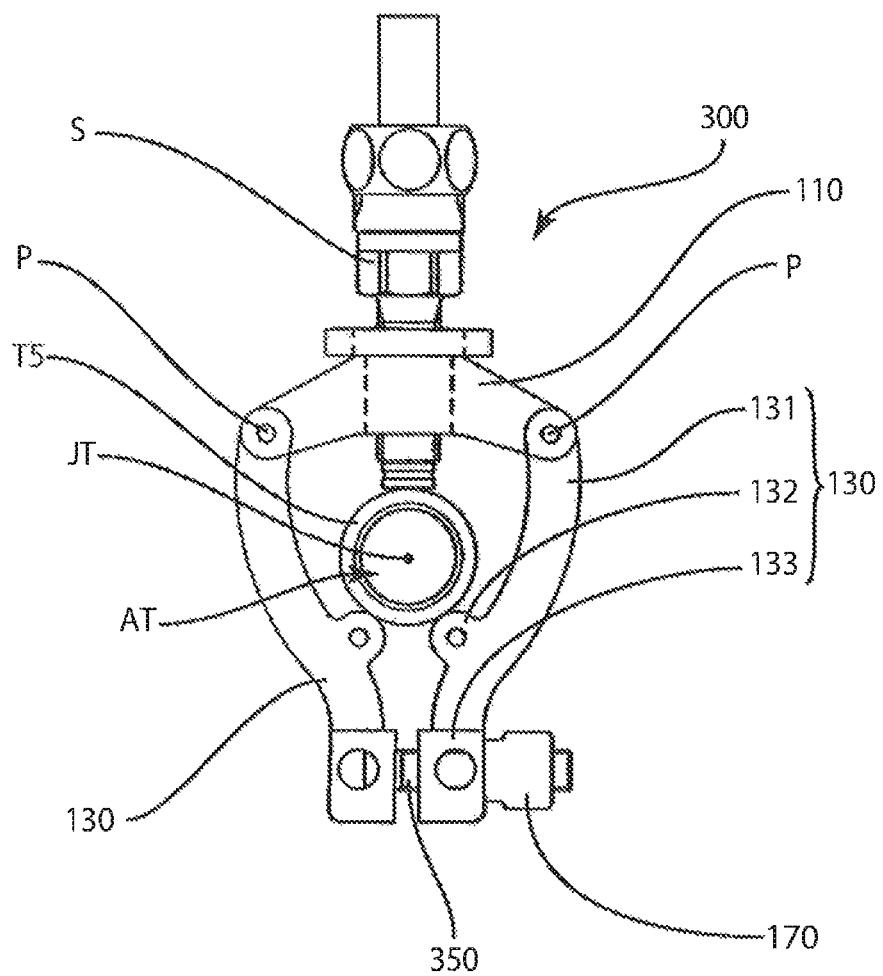
FIG. 7 is a view illustrating another embodiment of the sensor fixation device according to the present invention.
Figure 8:
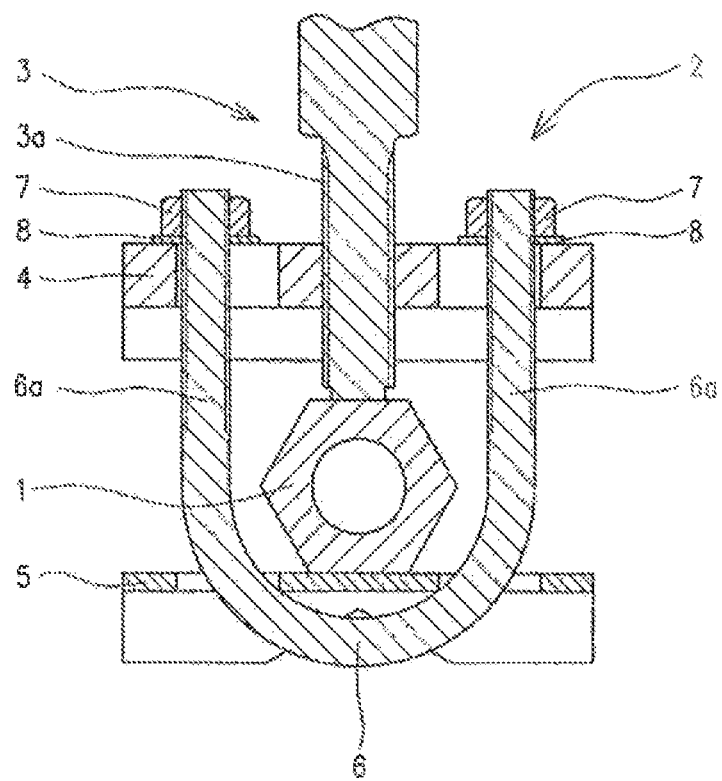
FIG. 8 is a view illustrating a generally employed sensor fixation device.

Referring to a sensor fixation device 300 as shown in FIG. 7, it is possible to employ a short mount bolt 350 for a trap opening T5 with small diameter.

(2) Steam Trap T:

In the first embodiment as described above, the steam trap has been described as the process system constituting equipment. However, it is not limited to the one as described above so long as the process system constituting equipment of arbitrary type has a predetermined opening. For example, the pump, reducing valve, separator, filter and the like may be employed as various types of the fluid control equipment.

INDUSTRIAL APPLICABILITY

The sensor fixation device according to the present invention may be applied to the fixation device for mounting a predetermined sensor on the steam trap.

LIST OF REFERENCE SIGNS

100: sensor fixation device
110: sensor fixation body
111: sensor mount opening
113: connecting arm
130: mount body
131: arm
132: trap abutment protrusion
133: nut mount portion
133a: first side wall
133a1: first mount nut retaining opening
133b: second side wall
133b1: second mount nut retaining opening
133c: third side wall
133c1: mount bolt insertion opening
150: mount bolt
151: head part
153: shaft part
J150: bolt axis
170: mount nut
171: nut part
173: nut spherical part
200: sensor fixation device
230: assisting mount body
250: mount bolt
300: sensor fixation device
350: mount bolt
T: steam trap
T1: trap opening
AT: trap opening
JT: trap opening axis
T3: trap opening
T5: trap opening
S: steam trap sensor

What is claimed is:

1. A sensor fixation device mounted on a mount portion of equipment, which is formed along a mount axis, comprising:
a body part disposed along an outer edge of the mount portion, having a first opening at one end and a second opening at another end, the body part comprising a nut mount portion, the nut mount portion comprising a first sidewall and second sidewall separated by a distance;
a mount bolt which is inserted into the first opening and the second opening of the body part along a bolt axis non-parallel to the mount axis in a mount state where the body part is disposed along the outer edge of the mount portion; and
a mount nut screwed to the mount bolt so as to secure the mount bolt to the body part,
wherein the mount nut comprises a first part directly and rotatably engaged with the nut mount portion and a second part extending from the nut mount portion and configured to be engaged to rotate the mount nut around the bolt axis, the first part of the mount nut having a width greater than the distance between the first sidewall and the second sidewall of the nut mount portion,
wherein the first sidewall and the second sidewall of the nut mount portion engage the mount nut therebetween to directly retain the mount nut on the body part so that the mount nut is rotatable with respect to the body part around the bolt axis of the mount bolt and so that dropping of the mount nut from the nut mount portion is prevented.

2. The sensor fixation device according to claim 1, wherein the mount nut is rotatable in a direction non-parallel to the bolt axis.

3. A sensor fixation device mounted on a mount portion of equipment, which is formed along a mount axis, comprising:
a body part disposed along an outer edge of the mount portion, having a first opening at a first end thereof and a second opening at a second end thereof;
a mount bolt which is inserted into the first opening and the second opening of the body part along a bolt axis non-parallel to the mount axis in a mount state where the body part is disposed along the outer edge of the mount portion; and
a mount nut screwed to the mount bolt so as to secure the mount bolt to the body part, wherein:
the body part includes a first side wall and a second side wall which face each other at the second end of the body part in the mount state, while being perpendicular to the mount axis;
the first side wall includes a first side wall opening;
the second side wall includes a second side wall opening;
the mount nut comprises a spherical part disposed between the first side wall and the second side wall, the spherical part having a diameter larger than a distance between the first and the second side walls and configured to be engaged with the first and the second side wall openings; and
wherein the mount nut further comprises a nut part extending from the body part and configured to be engaged to rotate the mount nut around the bolt axis.

4. The sensor fixation device according to claim 3, wherein the mount nut is rotatable in a direction non-parallel to the bolt axis.

* * * * *